US009406174B2

(12) United States Patent
Tart et al.

(10) Patent No.: US 9,406,174 B2
(45) Date of Patent: Aug. 2, 2016

(54) SYSTEMS AND METHODS FOR MONITORING PROTECTION DEVICES OF AN INDUSTRIAL MACHINE

(71) Applicant: General Electric Company, Schenectady, NY (US)

(72) Inventors: Michael Alan Tart, Minden, NV (US); Thomas Franklin Kalb, Minden, NV (US); Kyle Allan Farwell, Minden, NV (US); Curtis Lee Hoffman, Minden, NV (US); Paul Foster Richetta, Minden, NV (US)

(73) Assignee: General Electric Company, Schenectady, NY (US)

( * ) Notice: Subject to any disclaimer, the term of this patent is extended or adjusted under 35 U.S.C. 154(b) by 85 days.

(21) Appl. No.: 14/271,104

(22) Filed: May 6, 2014

(65) Prior Publication Data

US 2015/0325060 A1 Nov. 12, 2015

(51) Int. Cl.
*G08B 21/00* (2006.01)
*G07C 3/00* (2006.01)
*G05B 9/02* (2006.01)

(52) U.S. Cl.
CPC .. *G07C 3/00* (2013.01); *G05B 9/02* (2013.01); *G05B 2219/36529* (2013.01); *G05B 2219/36534* (2013.01)

(58) Field of Classification Search
CPC ............ G06F 11/2252; G06F 11/0796; G08B 21/187
USPC .................... 340/679, 506, 521, 527, 309.16; 307/116
See application file for complete search history.

(56) References Cited

U.S. PATENT DOCUMENTS

| | | | | |
|---|---|---|---|---|
| 5,870,317 | A * | 2/1999 | Barnett ............. | G05B 23/0256 307/115 |
| 5,920,263 | A * | 7/1999 | Huttenhoff ......... | A61B 5/02455 340/573.1 |
| 8,648,706 | B2 * | 2/2014 | Ranjun ............... | G08B 25/001 340/500 |
| 2002/0161554 | A1 | 10/2002 | Ditter et al. | |
| 2007/0088572 | A1 * | 4/2007 | Susai .................... | G06Q 10/06 705/2 |
| 2009/0031631 | A1 | 2/2009 | Baldini et al. | |
| 2013/0015967 | A1 | 1/2013 | Nagathil et al. | |

OTHER PUBLICATIONS

PCT Search Report and Written Opinion issued in connection with corresponding PCT Application No. PCT/US2015/018934 on May 20, 2015.

* cited by examiner

*Primary Examiner* — Phung Nguyen
(74) *Attorney, Agent, or Firm* — Fletcher Yoder, P.C.

(57) ABSTRACT

A system includes a machinery protection monitoring system. The machinery protection monitoring system includes a memory configured to store a plurality of alarm escalation rules associated with an operational protection function of an industrial machine, and a processor communicatively coupled to the memory and configured to utilize the plurality of alarm escalation rules. The processor is also configured to receive an indication that the operational protection of the industrial machine is at least partially suspended, compare the measurement of the one or more operational parameters to at least one of the plurality of alarm escalation rules, and generate an alarm signal based at least in part on whether the at least one of the plurality of alarm escalation rules is satisfied. The alarm signal includes an indication of an adverse operational condition of the machinery protection monitoring system.

20 Claims, 3 Drawing Sheets

SYSTEMS AND METHODS FOR MONITORING PROTECTION DEVICES OF AN INDUSTRIAL MACHINE

BACKGROUND

The invention relates generally to protection monitoring systems, and more specifically, to systems and methods for advanced alarm systems and/or protection monitoring systems.

Certain remote and/or on-site monitoring of industrial machinery, such as turbines, generators, motors, and so forth, may include receiving and responding to a number of protection alarms and/or alarm alerts. One or more protection monitoring instrumentation and/or or other protection monitoring devices may include user configurable functions that may allow a plant operator, field technician, or instrumentation engineer, for example, to disable or temporarily suspend one or more of the prescribed protection functions and/or operational setpoints of the protection monitoring devices. However, if the prescribed protection functions and/or operational setpoints are not promptly and systematically reengaged, the industrial machinery (e.g., turbines, generators, motors, and so forth) may be susceptible to operating under adverse conditions without the protection monitoring devices providing any alarm alerts or other electronic notifications to plant maintenance and/or safety personnel. It may be useful to provide more advanced alarm systems and/or protection monitoring systems.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a machinery protection monitoring system. The machinery protection monitoring system includes a memory configured to store a plurality of alarm escalation rules associated with an operational protection function of an industrial machine, and a processor communicatively coupled to the memory and configured to utilize the plurality of alarm escalation rules. The processor is also configured to receive an indication that the operational protection of the industrial machine is at least partially suspended, compare the measurement of the one or more operational parameters to at least one of the plurality of alarm escalation rules, and generate an alarm signal based at least in part on whether the at least one of the plurality of alarm escalation rules is satisfied. The alarm signal includes an indication of an adverse operational condition of the machinery protection monitoring system.

In a second embodiment, a non-transitory computer-readable medium having code stored thereon includes instructions to receive a measurement of one or more operational parameters associated with an operation of an industrial machine, receive an indication that the operational protection of the industrial machine is at least partially suspended, compare the measurement of the one or more operational parameters to at least one of a plurality of alarm escalation rules, and generate an alarm signal based at least in part on whether the at least one of the plurality of alarm escalation rules is satisfied. The alarm signal includes an indication of an adverse operational condition of the machinery protection monitoring system.

In a third embodiment, a system includes a processor configured to receive a measurement of one or more operational parameters associated with an operation of an industrial machine, receive an indication of an activation of a user control configured to temporarily disable a protection function of the machinery monitoring protection system. The protection function is configured to protect the operation of the industrial machine. The processor is also configured to generate a first alarm alert in response to the indication, compare the measurement of the one or more operational parameters to at least one of the plurality of alarm escalation rules, and generate a second alarm alert based at least in part on whether the at least one of the plurality of alarm escalation rules is satisfied.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Present embodiments relate to a machinery protection monitoring system useful in detecting user-invoked inhibition or a temporary suspension of certain protection functions of the machinery protection monitoring system by way of alarm escalation rule-based functions. Specifically, the protection monitoring system may generate and transmit signals to energize a number of relays to indicate whether or not a fault (e.g., an electrical fault, a code related error, or other error), or other adverse operating condition, on one or more industrial machines (e.g., compressor, turbine, and so forth) of an industrial system has occurred. In certain embodiments, the protection monitoring system may indicate whether or not the fault has occurred based on, for example, a set of alarm escalation rules. For example, the set of alarm escalation rules may include a predetermined or user-configurable operational parameter range that the industrial machine is expected to operate within, a predetermined or user-configurable time limit for the user-invoked inhibition or temporary suspension of the protection functions, or determinable mode of operation the industrial machine is expected to operate according thereto. In this way, the protection monitoring system may substantially reduce any possibility of the protection functions of the protection monitoring system being inadvertently left inhibited and/or temporarily suspended by the user, and, by extension, reduce any possibility of the industrial machines of the industrial system operating while in an unprotected state or under other adverse conditions.

Figure 1:
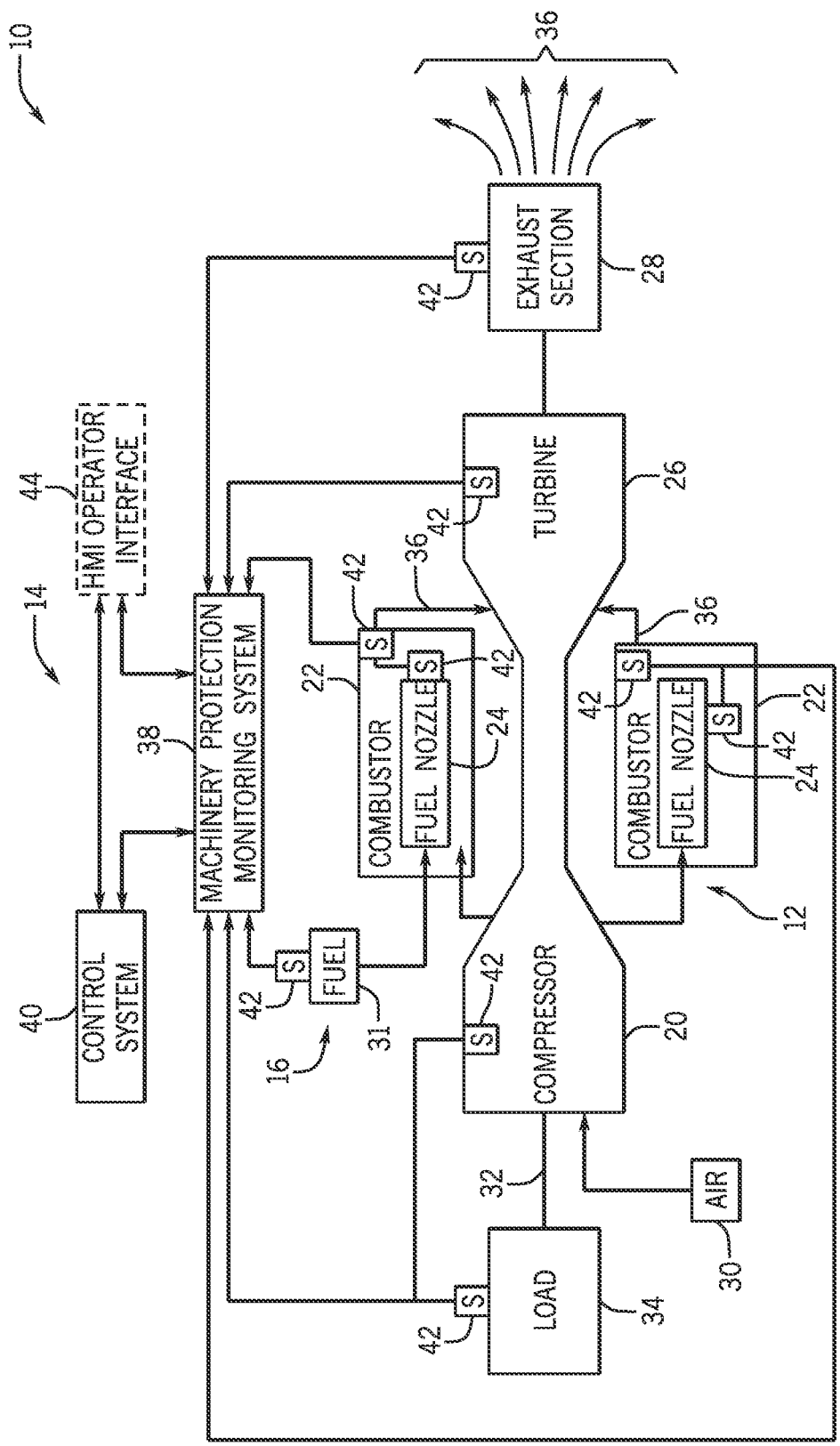
FIG. 1 is a block diagram of an embodiment of an industrial system including one or more industrial machines, in accordance with the present embodiments.

With the foregoing in mind, it may be useful to describe an embodiment of an industrial system, such as an example industrial system 10 illustrated in FIG. 1. Indeed, while the present embodiments may be discussed with respect to an illustration of a gas turbine system (e.g., as illustrated in FIG. 1), it should be appreciated that the industrial system 10 may, in some embodiments, include a steam turbine system, a hydraulic turbine system, one or more compressor systems (e.g., aeroderivative compressors, reciprocating compressors, centrifugal compressors, axial compressors, screw compressors, and so forth), one or more electric motor systems, industrial systems including, for example, fans, extruders, blowers, centrifugal pumps, or any of various other industrial machinery that may be included in an industrial plant or other industrial facility. As will be further appreciated, the techniques discussed herein may be used to monitor and protect any of the aforementioned industrial machinery, or any combination of the industrial machinery.

As illustrated in FIG. 1, the industrial system 10 may include a gas turbine system 12, a monitoring and control system 14, and a fuel supply system 16. The gas turbine system 12 may include a compressor 20, combustion systems 22, fuel nozzles 24, a turbine 26, and an exhaust section 28. During operation, the gas turbine system 12 may pull air 30 into the compressor 20, which may then compress the air 30 and move the air 30 to the combustion system 22 (e.g., which may include a number of combustors). In the combustion system 22, the fuel nozzle 24 (or a number of fuel nozzles 24) may inject fuel that mixes with the compressed air 30 to create, for example, an air-fuel mixture.

The air-fuel mixture may combust in the combustion system 22 to generate hot combustion gases, which flow downstream into the turbine 26 to drive one or more turbine 26 stages. For example, the combustion gases move through the turbine 26 to drive one or more stages of turbine 26 blades, which may in turn drive rotation of a shaft 32. The shaft 32 may connect to a load 34, such as a generator that uses the torque of the shaft 32 to produce electricity. After passing through the turbine 26, the hot combustion gases may vent as exhaust gases 36 into the environment by way of the exhaust section 28. The exhaust gas 36 may include gases such as carbon dioxide ($CO_2$), carbon monoxide (CO), nitrogen oxides ($NO_x$), and so forth.

In certain embodiments, the system 10 may also include a machinery protection monitoring system 38, a control system 40, a number of sensors 42, and a human machine interface (HMI) operator interface 44. The machinery protection monitoring system 38 may receive data from the sensors 42. The machinery protection monitoring system 38 may output alarm signals, operational information signals, or other notifications to the control system 40 and the HMI operator interface 44. As will be further appreciated, in response to the sensor 42 data, the machinery protection monitoring system 38 may also energize one or more relay contacts based on the sensor data to generate an alarm signal indicative of, for example, operational condition of the fuel system 16, the compressor 20, the turbine 26, the combustion system 22, the exhaust section 28, or other components of the industrial system 10.

In certain embodiments, the HMI operator interface 44 may be executable by one or more computer systems (although not illustrated), which may be used by a plant operator to interface with the industrial system 10 via an HMI operator interface 44. Accordingly, the HMI operator interface 44 may include various input and output devices (e.g., mouse, keyboard, monitor, touch screen, or other suitable input and/or output device) such that a plant operator may provide commands (e.g., control and/or operational commands) to the machinery protection monitoring system 38 or the control system 40 and to receive operational information from the machinery protection monitoring system 38, the control system 40, or directly from the sensors 42. Similarly, the control system 40 may be responsible for controlling one or more final control elements coupled to the components (e.g., the compressor 20, the turbine 26, the combustors 22, the load 34, and so forth) of the industrial system 10 such as, for example, one or more actuators, valves, transducers, and so forth.

In certain embodiments, the sensors 42 may be any of various sensors useful in providing various operational data to the machinery protection monitoring system 38 including, for example, pressure and temperature of the compressor 20, speed and temperature of the turbine 26, vibration of the compressor 20 and the turbine 26, $CO_2$ levels in the exhaust gas 36, carbon content in the fuel 31, temperature of the fuel 31, temperature, pressure, clearance of the compressor 20 and the turbine 26 (e.g., distance between the compressor 20 and the turbine 26 and/or between other stationary and/or rotating components that may be included within the industrial system 10), flame temperature or intensity, vibration, combustion dynamics (e.g., fluctuations in pressure, flame intensity, and so forth), load data from load 34, and so forth. In some embodiments, the machinery protection monitoring system 38 may use the data received from the sensors 42 to generate one or more alarm signals according to an alarm escalation mechanism to indicate a fault or other adverse operating condition of one or more components (e.g., the compressor 20, the turbine 26, the combustors 22, the load 34, and so forth) of the industrial system 10. Thus, in one embodiment, the machinery protection monitoring system 38 may be programmably retrofitted with instructions to indicate a fault (e.g., an electrical fault, a code related error, or other error) or other adverse operating condition.

Figure 2:
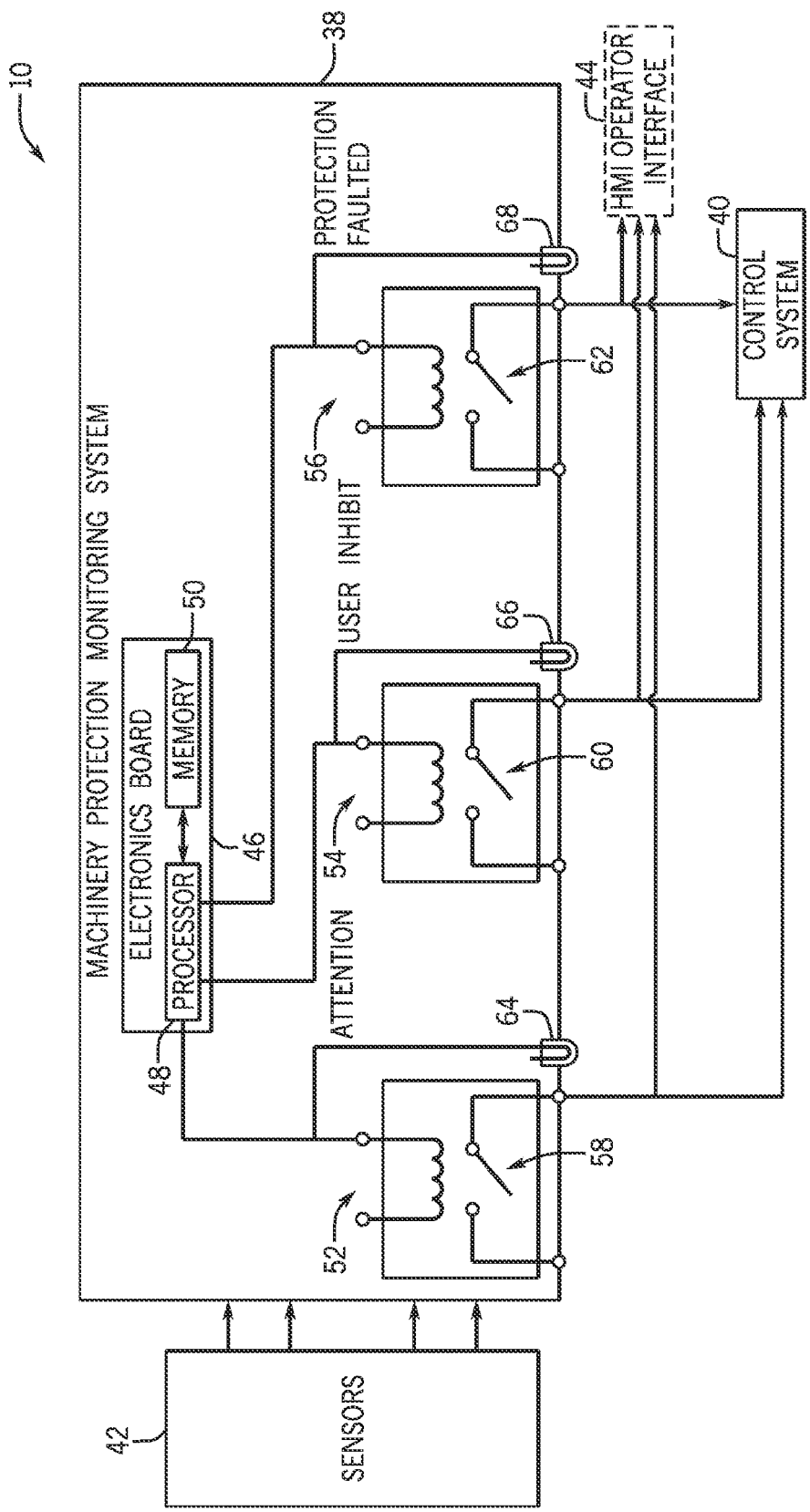
FIG. 2 is a diagram of an embodiment of the system of FIG. 1, including a machine protection monitoring system, in accordance with the present embodiments.

Turning now to FIG. 2, which illustrates a detailed embodiment of the machinery protection monitoring system 38. As generally discussed above, the machinery protection monitoring system 38 may include any device useful in providing continuous, online monitoring and protection of the compressor 20, the turbine 26, the combustors 22, or other components of the industrial system 10. In one embodiment, the machinery protection monitoring system 38 may be enclosed inside, for example, a finished cabinet, such that the machinery protection monitoring system 38 may be panel mounted (e.g., near the compressor 20, the turbine 26, or other machinery that may be monitored by the monitoring system 38) or retrofitted as a standalone and/or integrated system. As further depicted, the machinery protection monitoring system 38 may include an electronic board 46, which may further include a processor 48 that may be operatively coupled to a memory 50 to execute instructions for carrying out the presently disclosed techniques. These instructions may be encoded in programs or code stored in a tangible non-transitory computer-readable medium, such as the memory 50 and/or other storage. The processor 48 may be a general purpose processor, system-on-chip (SoC) device, an application-specific integrated circuit (ASIC), or some other processor configuration.

In certain embodiments, the processor 48 may receive the sensor 42 data (e.g., pressure and temperature of the compressor 20, speed and temperature of the turbine 26, vibration of the compressor 20 and the turbine 26, $CO_2$ levels in the exhaust gas 36, carbon content in the fuel 31, temperature of the fuel 31, temperature, pressure, clearance of the compressor 20 and the turbine 26, flame temperature or intensity, vibration, and combustion dynamics of the combustion system 22, load data from load 34, and so forth), and may use the sensor 42 data as part of one or more protection functionalities to monitor and protect the operational health of, for example, the fuel system 16, the compressor 20, the turbine 26, combustion system 22, the exhaust section 28, or other components that may be included in the industrial system 10. For example, in one embodiment, the machinery protection monitoring system 38 may be a Bently Nevada 3500 Series Machinery Monitoring System™, available from General Electric Co. of Schenectady, N.Y.

In certain embodiments, although not illustrated, the electronic board 46 of the machinery protection monitoring system 38 may include a number of respective monitors for monitoring respective operating inputs and/or outputs. The respective monitors may each occupy respective slots in a rack of the protection monitoring system 38. The processor 48 may provide user-adjustable protection and/or control setpoints for each of a number of input and/or output channels of the protection monitoring system 38, and generate and transmit alarm signals to one or more relays 52, 54, and 56. The alarm signals may also be passed to one or more front-panel indicators 64, 66, and 68 (e.g., light-emitting diodes (LEDs)), facilitating, for example, plant operator or technician observation. In one embodiment, the processor 48 may provide proportional 4 to 20 milliamp (mA) outputs for each of the number of channels of the protection monitoring system 38 via the relays 52, 54, and 56 to the control system 40. Based on these outputs, the control system 40 may provide outputs to transducers or other final control elements (e.g., valves, actuators, etc.).

In certain embodiments, the protection monitoring system 38 may be programmed or configurable (e.g., performed via the processor 48 and the memory 50) to support a number of protection functions, and to be responsive to a number of detected operating conditions of the industrial system 10. For example, in certain embodiments, the machinery protection monitoring system 38 may include a fault detection and management system useful in detecting (e.g., via sensors 42), isolating (e.g., tripping one or more final control elements that may be coupled to the compressor 20 or the turbine 26), and monitoring and/or compensating for one or more adverse operating conditions of the industrial system 10 (e.g., speed, temperature, pressure, vibration, flow, fuel consumption, power production, clearance).

However, in some embodiments, one or more sets of protection and/or monitoring functions may be temporarily inhibited or suspended by, for example, plant personnel (e.g., operators, technicians, engineers, contractors, and so forth) servicing one or more components (e.g., the compressor 20, the turbine 26, the combustors 22, the load 34, and so forth) of the industrial system 10. The one or more sets of protection and/or monitoring functions may also be temporarily inhibited by, for example, plant personnel manually placing the protection monitoring system 38 in an inhibit mode (e.g., during start-up or the transient operational state of the turbine 26 or during a time in which a component associated with the turbine 26 may be in disrepair), and then inadvertently leaving the protection monitoring system 38 in the inhibit mode. To aid in maintaining the protection monitoring of the industrial system 10, it may be useful to provide certain procedures that may be implemented.

For example, in certain embodiments, it may be useful to program and/or configure (e.g., via the processor 48 and the memory 50) the protection monitoring system 38 to automatically control the inhibition or temporary suspension of the protection functions by way of alarm escalation rule-based functions. Specifically, the processor 48 may generate and transmit alarm signals to the relays 52, 54, and 56) to indicate whether or not a fault (e.g., electrical fault, code related error, or other error) has occurred based on, for example, the one or more alarm escalation rule-based functions. In certain embodiments, the relays 52 (e.g., ATTENTION relay 52), 54 (e.g., USER INHIBIT relay 54), and 56 (e.g., PROTECTION FAULTED relay 56) may include, for example, single-pole double-throw (SPDT) relays, double-pole double-throw (DPDT) relays, or any electronic relay devices that may be energized based on control signals received from the processor 48 to operate (e.g., close and/or open) respective contacts 58, 60, and 62 to perform one or more control actions (e.g., signal an alarm, an alert, or other notification via the control system 40, the HMI operator interface 44, or the panel indicators 64, 66, and 68).

In certain embodiments, as previously discussed, the protection monitoring system 38 may provide indications of whether or not a fault has occurred based on, for example, the one or more alarm escalation rule-based functions. The alarm escalation rule-based functions may include one or more sets of iterative alarm escalation rules (e.g., stored in the memory 50) that may be predetermined or adjustable (e.g., user-configurable), and may be based on, for example, machine speed (e.g., compressor 20 speed, turbine 26, and so forth), machine mode of operation (e.g., turbine 26 trip multiply mode of operation), a predetermined or adjustable timing sequence (e.g., timer), or other similar operational characteristic. For example, in one embodiment, the protection monitoring system 38 may include alarm escalation rules according to a predetermined operational parameter range (e.g., speed range, a pressure range, a temperature range, a vibration range, a flow range, a frequency range, a clearance range, and so forth). Specifically, the protection monitoring system 38 may be programmed or conditioned to generate an alarm signal, or a number of alarm signals according to the alarm escalation level, when one or more components of the industrial system 10 is operating outside of the predetermined operating parameter range.

For example, in certain embodiments, the protection monitoring system 38 may include an alarm escalation rule to automatically shift (e.g., increase or decrease depending on the specific application) normal operating protection and/or control setpoints for compressor 20 and/or turbine 26 vibrations (e.g., between approximately 3 mils of vibration and 6 mils of vibration), turbine 26 speed (e.g., between approximately 5,000 revolutions per minute (rpm) and 17,500 rpm), compressor 20 pressure (e.g., between approximately 1000 pounds per square inch (psi) and 18,000 psi), turbine 26 and exhaust section 28 temperature (e.g., between approximately 300° C. and 600° C.), combustors 22 flame intensity, air 30 to fuel 31 ratio (AFR), and so forth, to compensate for certain transient operating conditions (e.g., during start-up or commissioning of components of the compressor 20 or the turbine 26).

Specifically, during ignition or commissioning of the turbine 26 (e.g., during start-up or the transient operational state of the turbine 26), for example, the programmed protection setpoints of the protection monitoring system 38 may be temporarily adjusted (e.g., manually by a plant operator or automatically) to allow the turbine 26 to transition from the transient operating conditions during ignition or commissioning to the steady-state normal operating conditions. Specifically, these techniques may be performed to allow the turbine 26 to pass through the speed that may be the same as the structural resonance of the turbine 26. In such an embodiment, if the processor 48 of the protection monitoring system 38 determines that the turbine 26 is operating outside of the predetermined speed range, the processor 48 may generate an attention signal (e.g., a signal to relay 52 and indicator 64) and a user inhibit alarm signal (e.g., a notification that plant personnel has temporarily suspended a protection function of the protection monitoring system 38), and may then escalate to generating a protection faulted alarm signal (e.g., a notification that a fault or other adverse operating effect has occurred) when the processor 48 determines after some period of time that the turbine 26 has been operating outside of the predetermined speed range.

In other embodiments, the protection monitoring system 38 may indicate whether or not a fault has occurred based on a timer (e.g., user-configurable time limit expressed in hours, minutes, seconds, and so forth) alarm escalation rule. For example, upon detection that an inhibit protection function has been enabled (e.g., due to a possible fault or due to manual inhibition or temporary suspension of the protection function performed by plant personnel), the protection monitoring system 38 may initiate a countdown timer or count-up timer, for example. If the protection function is not reengaged within the specified time period, the processor 48 of the protection monitoring system 38 may indicate that a fault (e.g., electrical fault, code related error, or other error) has occurred via the relay 56 and panel indicator 68. Additionally, in another embodiment, the protection monitoring system 38 may indicate whether or not a fault has occurred based on a mode of operation escalation rule. For example, the processor 48 may indicate that a fault has occurred based on whether a trip multiply function (e.g., a temporarily increased in magnitude of the control setpoints by a predetermined integer factor) of the protection monitoring system 38 has been activated.

Specifically, as discussed above, upon detection that an inhibit protection function has been enabled (e.g., due to a possible fault or due to manual inhibition or due to manual inhibition or temporary suspension of the protection function performed by plant personnel), the protection monitoring system 38 may automatically transmit a signal to energize the relay 52 and attention indicator 64 and the relay 54 and the user inhibit relay indicator 66. Particularly, the relay 52 and the attention indicator 64 may, in some embodiments, represent a first level of the escalation process. For example, the relay 52 and the attention indicator 64 may be energized to alert a plant operator or engineer (e.g., via the HMI operator interface) that either inhibit function has been invoked, or that some other event or action by plant personnel has occurred at the protection monitoring system 38. Similarly, the relay 54 and the user inhibit relay indicator 66 may be energized may be specifically indicate that a protection inhibit function has been enabled. For example, in certain embodiments, the processor 48 may transmit a signal to energize the relay 54 to indicate an inhibition of a rack alarm inhibit, a special alarm inhibit, a channel bypass, an alert inhibit, a danger inhibit, trip multiply mode of operation, and so forth.

In certain embodiments, the processor 48 of the protection monitoring system 38 may then escalate, for example, when an escalation rule is satisfied, in which the processor 48 of the protection monitoring system 38 may transmit an signal to the relay 56 and the protection faulted indicator 68 to indicate the presence of a fault (e.g., electrical fault, code related error, or other error) on one or more components of the industrial system 10 such as the compressor 20, the turbine 26, or other components of the turbine system 10. The processor 48 of the protection monitoring system 38 may transmit one or more alarm signals to the relays 52, 54, and 56 to initiate one or more actions such as, for example, signaling an alarm, generating an alert, or generating some other notification via the control system 40, the HMI operator interface 44, or the panel indicators 64, 66, and 68. In this way, the protection monitoring system 38 may substantially reduce any possibility of the protection functions of the protection monitoring system 38 being inadvertently left inhibited and/or temporarily suspended, and, by extension, may reduce any possibility of components (e.g., the compressor 20, the turbine 26, the combustors 22, the load 34, and so forth) of the industrial system 10 operating while in an unprotected state or under other adverse conditions.

Figure 3:
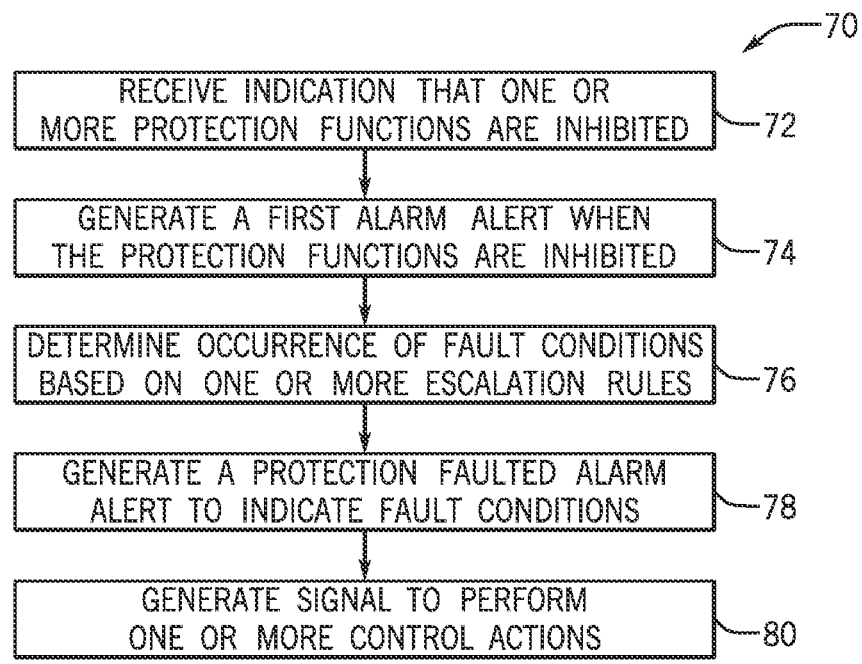
FIG. 3 is a flowchart illustrating an embodiment of a process useful in detecting and disabling user-invoked inhibit protection functions of the machine protection monitoring system of FIG. 2, in accordance with the present embodiments.

Turning now to FIG. 3, a flow diagram is presented, illustrating an embodiment of a process 70 useful in automatically signaling that protection functions of the machine protection monitoring system 38 has been inhibited or temporarily suspended according to an alarm escalation mechanism utilized, for example, the processor 48 depicted in FIG. 2. The process 70 may include code or instructions stored in a non-transitory computer-readable medium (e.g., the memory 50) and executed, for example, by the one or more processors 48 included in the protection monitoring system 38. The process 70 may begin with the processor 48 receiving (block 72) an indication that one or more protection functions have been inhibited or temporarily suspended. For example, one or more sets of protection and/or monitoring functions may be temporarily inhibited or suspended by, for example, plant personnel (e.g., operators, technicians, contractors) that may be servicing one or more components (e.g., the compressor 20, the turbine 26, the combustors 22, the load 34, and so forth) of the industrial system 10.

The process 70 may then continue with the processor 48 generating (block 74) an alarm as an indication that one or more protection functions have been inhibited or temporarily suspended. For example, the processor 48 may generate a signal to energize the relay 52 and attention indicator 64 and the relay 54 and the user inhibit relay indicator 66 to indicate via the control system 40 and/or the HMI operator interface 44, for example, a rack alarm inhibit, a special alarm inhibit, a channel bypass, an alert inhibit, a danger inhibit, trip multiply mode of operation, and so forth. The process 70 may then continue with the processor 48 determining (block 76) an occurrence of fault operating conditions based on one or more alarm escalation rules. For example, the processor 48 may determine whether a fault has occurred based on, for example, machine speed (e.g., compressor 20 speed, turbine 26, and so forth), machine mode of operation (e.g., turbine 26 trip multiply mode of operation), based on a predetermined or adjustable timing sequence (e.g., timer), or other similar operational characteristic.

The process 70 may then continue with the processor 48 generating (block 78) a protection faulted alarm signal when one or more of the alarm escalation rules are satisfied. For example, the processor 48 may generate a signal to energize the relay 56 and the protection faulted indicator 68, indicating via the control system 40 and/or the HMI operator interface 44, for example, that one or more components of the turbine system is operating in an unprotected and/or unmonitored state. The process 70 may then conclude with the processor 48 generating (block 80) and transmitting a signal as an indication to perform one or more control actions (e.g., by way of a transducer, actuator, valve, and so forth) to, for example, respond to the fault operating conditions and/or to automatically reengage the protection functions of the protection monitoring system 38 previously inhibited. In this manner, the protection monitoring system 38 may substantially reduce any possibility of the protection functions of the protection monitoring system 38 being inadvertently left inhibited and/or temporarily suspended, and, by extension, reduce any possibility of components (e.g., the compressor 20, the turbine 26, the combustors 22, the load 34, and so forth) of the industrial system 10 operating while in an unprotected state or under other adverse conditions.

Technical effects of the present embodiments relate to a machinery protection monitoring system useful in automatically controlling a user-invoked inhibition or temporary suspension of certain protection functions of the machinery protection monitoring system by way of alarm escalation rule-based functions. Specifically, the protection monitoring system may generate and transmit signals to energize a number of relays to indicate whether or not a fault or other adverse operating condition on one or more industrial machines (e.g., compressor, turbine, and so forth) of an industrial system has occurred. In certain embodiments, the protection monitoring system may indicate whether or not the fault has occurred based on, for example, a set of alarm escalation rules. For example, the set of alarm escalation rules may include a predetermined or user-configurable operational parameter range that the industrial machine is expected to operate within, a predetermined or user-configurable time limit for the user-invoked inhibition or temporary suspension of the protection functions, or determinable mode of operation the industrial machine is expected to operate according thereto. In this way, the protection monitoring system may substantially reduce any possibility of the protection functions of the protection monitoring system being inadvertently left inhibited and/or temporarily suspended by the user, and, by extension, may reduce any possibility of the industrial machines of the industrial system operating while in an unprotected state or under other adverse conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a machinery protection monitoring system, comprising:
   a memory configured to store a plurality of alarm escalation rules associated with an operational protection of an industrial machine;
   a processor communicatively coupled to the memory and configured to utilize the plurality of alarm escalation rules, and configured to:
   receive a measurement of one or more operational parameters associated with an operation of the industrial machine;
   receive an indication that the operational protection of the industrial machine is at least partially suspended;
   compare the measurement of the one or more operational parameters to at least one of the plurality of alarm escalation rules; and
   generate an alarm signal based at least in part on whether the at least one of the plurality of alarm escalation rules is satisfied, wherein the alarm signal comprises an indication of an adverse operational condition of the machinery protection monitoring system.

2. The system of claim 1, wherein the plurality of alarm escalation rules comprises a speed range, a pressure range, a temperature range, a vibration range, a flow range, a frequency range, a clearance range, or any combination thereof.

3. The system of claim 1, wherein the processor is configured to detect a user selection as an indication to temporarily shift a setpoint value of the one or more operational parameters associated with the operation of the industrial machine during a commissioning period of the industrial machine.

4. The system of claim 1, wherein the plurality of alarm escalation rules comprises one or more timing mechanisms configured to track an amount of time the operational protection of the industrial machine is suspended.

5. The system of claim 4, wherein the processor is configured to generate the alarm signal when the amount of time the operational protection of the industrial machine is suspended exceeds a configurable time period.

6. The system of claim 1, wherein the plurality of alarm escalation rules comprises a mode of operation of the industrial machine.

7. The system of claim 1, wherein the processor is configured to:
   generate an attention alarm signal upon a receipt of the indication that the operational protection is at least partially suspended, wherein the attention alarm signal comprises a notification;
   generate a user inhibit alarm signal based at least in part on a characteristic of the suspended operational protection;
   compare the measurement of the one or more operational parameters to the at least one of the plurality of alarm escalation rules; and
   generate a protection faulted alarm signal based at least in part on whether the at least one of the plurality of alarm escalation rules is satisfied, wherein the protection faulted alarm signal comprises an indication of a fault as the adverse operational condition.

8. The system of claim 7, wherein the processor is configured to:
   transmit the attention alarm signal to energize a first control path;
   transmit the user inhibit alarm signal to energize a second control path; and
   transmit the protection faulted alarm signal to energize a third control path;
   wherein the first control path, the second control path, and the third control path are configured to respectively transmit the attention alarm signal, the user inhibit alarm signal, and the protection faulted alarm signal to an external control system.

9. The system of claim 1, wherein the industrial machine comprises a turbine, a motor, a generator, a compressor, or any combination thereof.

10. The system of claim 1, wherein the memory is configured to be programmably retrofitted with instructions comprising the plurality of alarm escalation rules.

11. A non-transitory computer-readable medium having computer executable code stored thereon, the code comprising instructions to:
receive a measurement of one or more operational parameters associated with an operation of an industrial machine;
receive an indication that the operational protection of the industrial machine is at least partially suspended;
compare the measurement of the one or more operational parameters to at least one of a plurality of alarm escalation rules; and
generate an alarm signal based at least in part on whether the at least one of the plurality of alarm escalation rules is satisfied, wherein the alarm signal comprises an indication of an adverse operational condition of a machinery protection monitoring system.

12. The non-transitory computer-readable medium of claim 11, wherein the code comprises instructions to compare the measurement of the one or more operational parameters to a speed range, a pressure range, a temperature range, a vibration range, a flow range, a frequency range, a clearance range, or any combination thereof, as the at least one of the plurality of alarm escalation rules.

13. The non-transitory computer-readable medium of claim 11, wherein the code comprises instructions to detect a user selection as an indication to temporarily shift a setpoint value of the one or more operational parameters associated with the operation of the industrial machine during a commissioning period of the industrial machine.

14. The non-transitory computer-readable medium of claim 11, wherein the code comprises instructions to track an amount of time the operational protection of the industrial machine is suspended.

15. The non-transitory computer-readable medium of claim 11, wherein the code comprises instructions to generate the alarm signal when the amount of time the operational protection of the industrial machine is suspended exceeds a configurable time period.

16. The non-transitory computer-readable medium of claim 11, wherein the code comprises instructions to determine a mode of operation of the industrial machine as the at least one of the plurality of alarm escalation rules.

17. The non-transitory computer-readable medium of claim 11, wherein the code comprises instructions to:
generate an attention alarm signal upon a receipt of the indication that the operational protection is at least partially suspended, wherein the attention alarm signal comprises a notification;
generate a user inhibit alarm signal based at least in part on a characteristic of the suspended operational protection;
compare the measurement of the one or more operational parameters to the at least one of the plurality of alarm escalation rules; and
generate a protection faulted alarm signal based at least in part on whether the at least one of the plurality of alarm escalation rules is satisfied, wherein the protection faulted alarm signal comprises an indication of a fault as the adverse operational condition.

18. A machinery monitoring protection system, comprising:
a processor configured to:
receive a measurement of one or more operational parameters associated with an operation of an industrial machine;
receive an indication of an activation of a user control configured to temporarily disable a protection function of the machinery monitoring protection system, wherein the protection function is configured to protect the operation of the industrial machine;
generate a first alarm alert in response to the indication;
compare the measurement of the one or more operational parameters to at least one of a plurality of alarm escalation rules; and
generate a second alarm alert based at least in part on whether the at least one of the plurality of alarm escalation rules is satisfied.

19. The machinery monitoring protection system of claim 18, wherein the first alarm alert comprises a notification that the industrial machine is operating in an unprotected state, and wherein the second alarm alert comprises a notification of a fault.

20. The machinery monitoring protection system of claim 18, comprising a plurality of relays configured to be energized to respectively generate the first alarm alert and the second alarm alert, and wherein the processor is configured to generate the first alarm alert before generating the second alarm alert.

* * * * *